United States Patent
Lee et al.

(10) Patent No.: US 9,367,577 B2
(45) Date of Patent: Jun. 14, 2016

(54) METHOD FOR PROCESSING PATENT INFORMATION FOR OUTPUTTING CONVERGENCE INDEX

(75) Inventors: Nak Kyu Lee, Incheon (KR); Hye Jin Lee, Incheon (KR); Jung Han Song, Uiwang-si (KR); Jeanho Park, Ansan-si (KR); Sung Min Bae, Seoul (KR); Hyoung Wook Lee, Chungju-si (KR); Chul Young Kim, Seoul (KR)

(73) Assignee: KITECH, KOREA INSTITUTE OF INDUSTRIAL TECHNOLOGY, Chungcheongnam-Do (KR)

( * ) Notice: Subject to any disclaimer, the term of this patent is extended or adjusted under 35 U.S.C. 154(b) by 485 days.

(21) Appl. No.: 14/116,079

(22) PCT Filed: Dec. 30, 2011

(86) PCT No.: PCT/KR2011/010394
§ 371 (c)(1),
(2), (4) Date: Feb. 4, 2014

(87) PCT Pub. No.: WO2012/153907
PCT Pub. Date: Nov. 15, 2012

(65) Prior Publication Data
US 2014/0181118 A1 Jun. 26, 2014

(30) Foreign Application Priority Data

May 9, 2011 (KR) .................. 10-2011-0043318

(51) Int. Cl.
*G06F 17/30* (2006.01)
*G06Q 10/10* (2012.01)
*G06Q 50/18* (2012.01)

(52) U.S. Cl.
CPC .......... *G06F 17/30321* (2013.01); *G06Q 10/10* (2013.01); *G06Q 50/184* (2013.01)

(58) Field of Classification Search
CPC .......... G06F 17/3002; G06F 17/30094; G06F 17/30613; G06F 17/30778; G06F 17/30312; G06F 17/30858; G06F 17/30911; G06F 17/30946
USPC .................. 707/741, 742, 743, 744, 745, 746
See application file for complete search history.

(56) References Cited

U.S. PATENT DOCUMENTS

2007/0106662 A1* 5/2007 Kimbrough ....... G06F 17/30707
2007/0136271 A1* 6/2007 Masuyama ............ G06Q 10/10

(Continued)

FOREIGN PATENT DOCUMENTS

KR 10-2009-0062251 A 6/2009

OTHER PUBLICATIONS

Moed et al., The Use of Publication and Patent Statistics in Studies of S&T Systems, 2005, 785 pages.*

(Continued)

*Primary Examiner* — Noosha Arjomandi
(74) *Attorney, Agent, or Firm* — Stein IP, LLC

(57) ABSTRACT

The present invention relates to a method for outputting a convergence index, and more particularly, to a method for outputting a convergence index by utilizing patent information. According to the method for outputting the convergence index of the present invention, the convergence index can be outputted by using time information related to a patent which is included in a patent group, a patent classification, and an industrial classification that corresponds to the patent classification. The method for outputting the convergence index of the present invention systematically outputs the convergence index by using patent data, which is an objective data, thereby outputting the convergence index which is objective and appropriate.

18 Claims, 6 Drawing Sheets

(56) References Cited

U.S. PATENT DOCUMENTS

| | | | | |
|---|---|---|---|---|
| 2008/0201187 A1* | 8/2008 | Ng | ................... | G06Q 10/06375 705/7.29 |
| 2008/0263036 A1* | 10/2008 | Yamamoto | ........ | G06F 17/30011 |
| 2008/0301138 A1* | 12/2008 | Hasan | .................... | G06Q 10/10 |
| 2011/0082839 A1* | 4/2011 | Resnick | ............ | G06F 17/30867 707/688 |
| 2012/0179684 A1* | 7/2012 | Alba | ................. | G06F 17/30631 707/738 |
| 2014/0181118 A1* | 6/2014 | Lee | ................... | G06F 17/30321 707/746 |
| 2015/0227590 A1* | 8/2015 | Nissen | ............. | G06F 17/30014 707/728 |

OTHER PUBLICATIONS

"A Study on Forecast of the Promising Fusion Technology by US Patent Analysis," Hee Jong Hang et al., Dec. 28, 2006.

"The World's First Conversion Index Developed", MKE homepage, Ministry of Knowledge Economy, May 7, 2010.

* cited by examiner

METHOD FOR PROCESSING PATENT INFORMATION FOR OUTPUTTING CONVERGENCE INDEX

CROSS-REFERENCE TO RELATED APPLICATIONS

This application is a national stage of International Application No. PCT/KR2011/010394, filed Dec. 30, 2011, which claims the benefit of Korean Application No. 10-2011-0043318, filed May 9, 2011, in the Korean Intellectual Property Office. All disclosures of the document(s) named above are incorporated herein by reference.

BACKGROUND OF THE INVENTION

1. Field of the Invention

The present invention relates to a method for calculating a convergence index, and more particularly, to a method for calculating a convergence index by utilizing patent information.

2. Description of the Related Art

With the start of the 21st century, convergence between homogeneous and heterogeneous fields such as technology and technology, product and service, service and service, or the like over all industrial areas has accelerated. The term "convergence" has started to be used in such a manner that combination of communication, broadcasting, and media has been predicted by Professor Negroponte of MIT and the predicted combination has been examined in academia.

For example, over the course of the 1990s, all industrial areas developed into IT convergence in which IT is combined.

With the start of the 21st century, the United States, the EU, Japan, and the like have expanded R&D and investment with respect to convergence technologies, and various types of convergence have exponentially increased. The United States set convergence of bio technologies, information technologies, and cognitive science based on nano technologies as the national agenda, and the EU aims for convergence of a wide range of disciplines and technologies as well as convergence of nano, bio, information, and cognitive (NBIC) technologies.

In this manner, convergence has been established as the global agenda in the world, and in Korea, according to such global trends, the "Industrial Convergence Promotion Act" was passed in the National Assembly on April 2011, and became effective in October 2011.

However, despite such trends of convergence, a clear and highly valid convergence index which quantifies the degree of convergence has not been developed, and therefore there are urgent needs to develop an objective and reasonable convergence index.

SUMMARY OF THE INVENTION

Technical Problem to be Solved

The present invention is directed to a method for processing patent information for calculating an objective convergence index.

Specifically, the present invention is directed to a method for processing patent information for calculating a capability development index, a capability convergence index, and an industry relation index which constitute a convergence index.

Technical Solution

According to an aspect of the present invention, there is provided a method for processing patent information by a convergence index service system for calculating the convergence index, the method including: (a) acquiring a patent classification related to a patent included in a patent group and an industrial classification corresponding to the patent classification; (b) calculating an industrial distribution ratio based on the industrial classification; (c) selecting at least two of the industrial classification according to number of patents related to the industrial classification; (d) calculating a degree of technological convergence based on the number of patents related to the industrial classification selected in the step (c); (e) calculating a relation score of heterogeneous industries based on the industrial distribution ratio and the degree of technological convergence; (f) calculating a technological distribution ratio based on the number of patents related to the industrial classification selected in the step (c); (g) calculating a technological occupation ratio based on number of patent classification including the patent related to the industrial classification selected in the step (c); (h) calculating a relation score of homogeneous industries based on the technological distribution ratio and the technological occupation ratio; and (i) calculating an industry relation index using the relation score of heterogeneous industries and the relation score of homogeneous industries.

The step (g) may include normalizing the technological occupation ratio based on a correction coefficient of the technological occupation ratio.

The correction coefficient may be applied according to a rank of the industrial classification.

The patent classification may be determined according to a predetermined depth in a patent classification system including the patent classification.

The patent classification may include International Patent Classification (IPC), and the predetermined depth may be any one of subclass, main group and n dot subgroup (where n is a natural number).

The patent classification may include United States Patent Classification (USPC), and the predetermined depth is any one of class, no dot subclass and n dot subclass (where n is a natural number).

The patent classification may be determined according to a predetermined depth in a patent classification system including the patent classification The patent classification may include a main patent classification.

According to another aspect of the present invention, there is provided a method for processing patent information by a convergence index service system for calculating the convergence index, the method including: (a) acquiring a patent classification related to a patent included in a patent group; (b) calculating number of patent classification related to a single patent; (c) acquiring weights of the number of patent classification corresponding to the number of patent classification; (d) calculating a capability convergence score based on the number of patent classification and the weights of the number of patent classification; (e) transmitting a service classification group including at least two services to the user computer; (f) receiving selection information including information on the service selected from the service classification group from the user computer; (g) calculating a service score based on the selection information; and (h) calculating a capability convergence index using the capability convergence score and the service score.

The step (d) may include calculating the capability score based on a depreciation coefficient indicating technological obsolescence.

The unit time may include one year.

The time information may include at least one of a filing date, a publication date and a registration date.

The patent may include at least one of a published patent and a registered patent.

The patent classification may include a sub patent classification and a main patent classification.

According to still another aspect of the present invention, there is provided a method for processing patent information which is performed in a system for servicing a convergence index which calculates the convergence index, the method including: acquiring a patent classification related to a patent included in a patent group; calculating the number of patent classifications based on the number of at least one of the patent classification related to the single patent; acquiring weights of the number of patent classifications corresponding to the number of patent classifications; calculating a capability convergence score based on the number of patent classifications and the weights of the number of patent classifications; transmitting a service classification group including at least two services to the user computer; receiving selection information including information about the service selected from the service classification group from the user computer; calculating a service score based on the selection information; and calculating a capability convergence index using the capability convergence score and the service score.

The step (g) may include calculating the service score based on service weights.

The patent classification may be determined according to a predetermined depth in a patent classification system including the patent classification.

The patent classification may include a main patent classification.

Advantageous Effects

In addition, the present invention may be used in systematically promoting convergence industry development.

The method for processing patent information for calculating the convergence index according to the present invention has the following effects.

First, according to the method for processing patent information for calculating the convergence index according to the present invention, the convergence index is systematically calculated using patent data, which is objective data, thereby calculating the convergence index which is objective and appropriate.

Second, when utilizing the method for processing patent information for calculating the convergence index according to the present invention, convergence indexes among products, industries, companies, technologies, and the like may be systematically and rapidly calculated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a system 1000 for servicing a convergence index according to an embodiment of the present invention will be described in detail with reference to the accompanying drawings.

Figure 1:
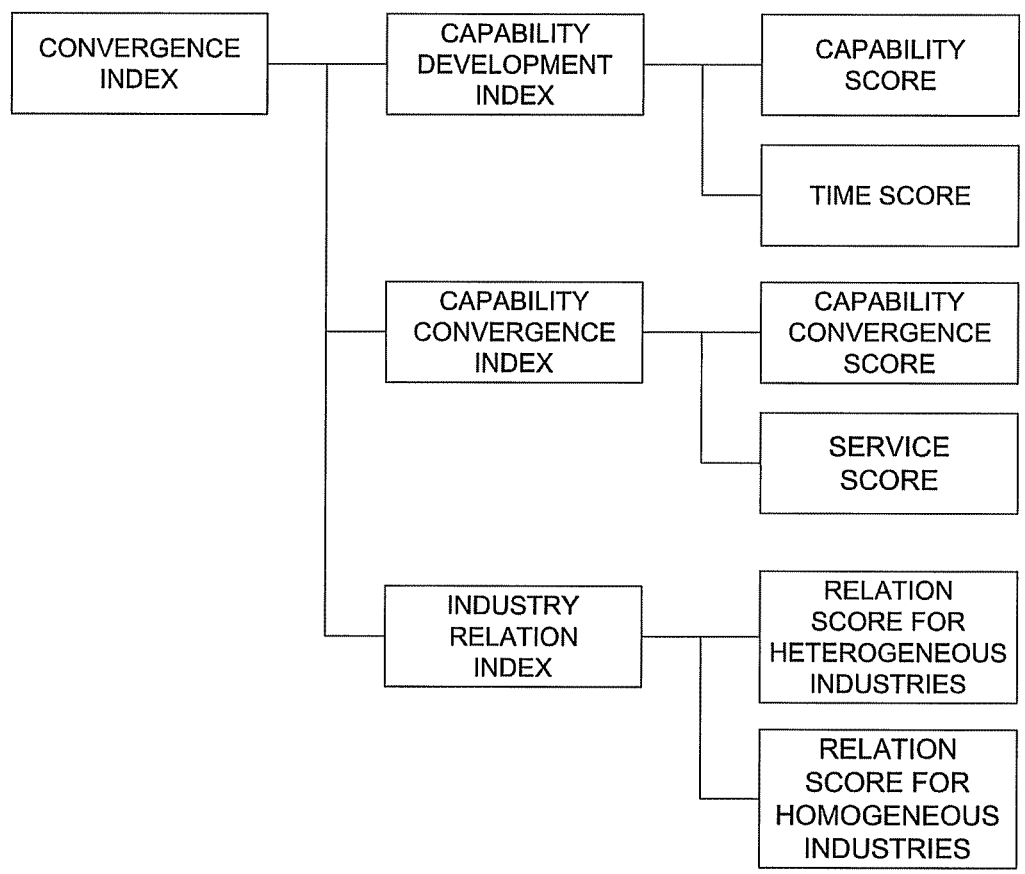
FIG. 1 is a structural diagram showing a relationship between a detailed convergence index and a sub element score which are included in a convergence index according to an embodiment of the present invention.

FIG. 1 is a structural diagram showing a relationship between a detailed convergence index and a sub element score which are included in a convergence index according to an embodiment of the present invention.

Referring to FIG. 1, the convergence index includes three detailed convergence indexes such as a capability development index, a capability convergence index, and an industry relation score. In addition, the capability development index is calculated based on a capability score and a time score, the capability convergence index is calculated based on a capability convergence score and a service score, and the industry relation index is calculated based on a relation score of heterogeneous industries and a relation score of homogeneous industries.

Hereinafter, a system 1000 for servicing a convergence index that calculates the three detailed convergence indexes will be described in detail.

Figure 2:
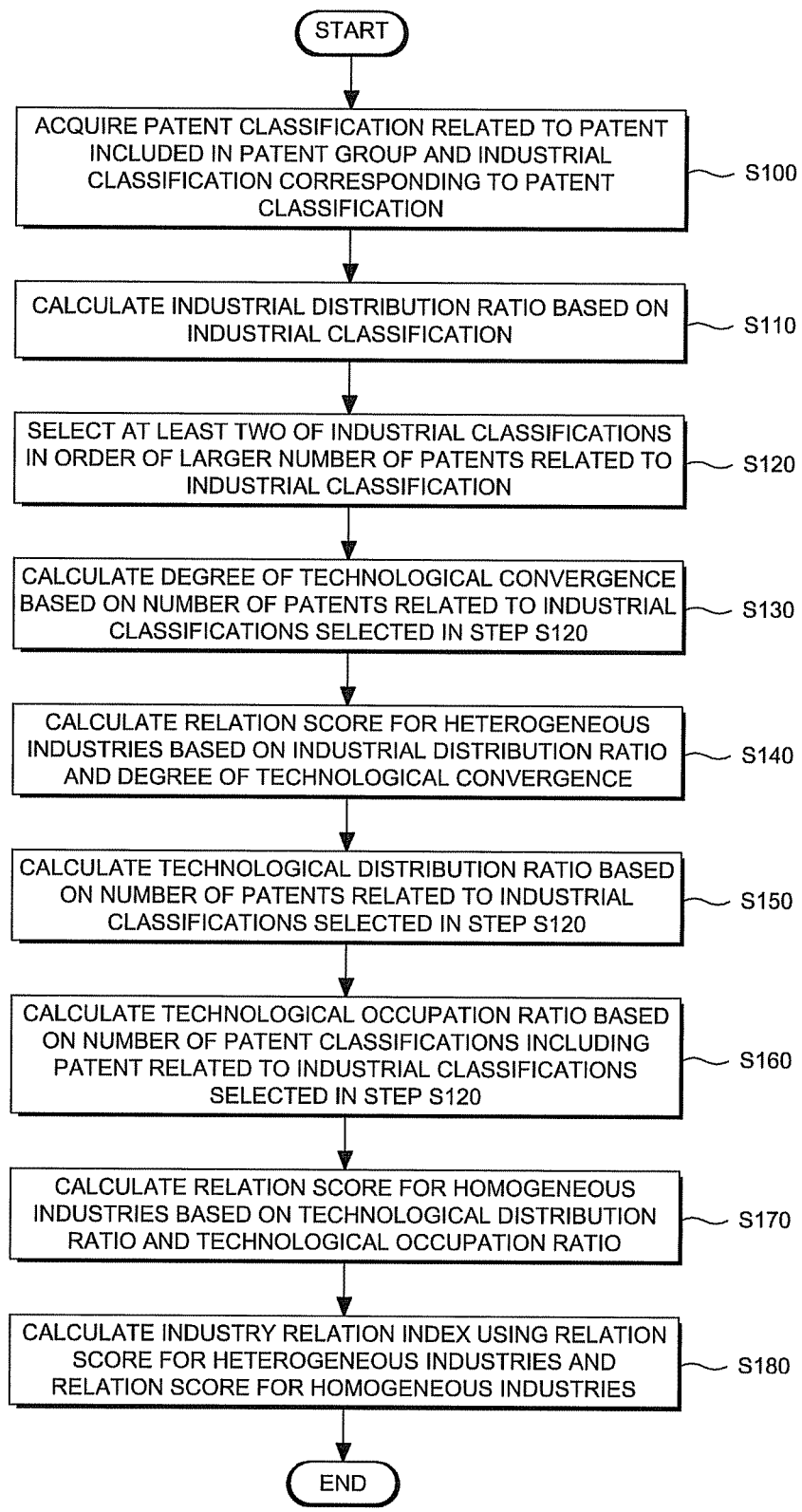
FIG. 2 is a flowchart showing a method for calculating an industry relation index according to an embodiment of the present invention.

FIG. 2 is a flowchart showing a method for calculating an industry relation index according to an embodiment of the present invention.

Referring to FIG. 2, in operation S100, the method includes acquiring a patent classification related to a patent included in a patent group and an industrial classification corresponding to the patent classification.

The patent group may be obtained by removing noise from results searched through a search engine based on search expressions including information about specific products, technologies, applicants, and the like. In addition, the patent group includes only published patents, only registered patents, or a mixture thereof. In the case of the mixture thereof, the same or different weights may be given to the published patents and the registered patents. In operation S100, the patent group may be obtained through search expressions, but the patent group may be obtained using patent data (patent number and the like) stored in a user computer. Meanwhile, when a user manages a project for calculating a plurality of convergence indexes, at least one patent group corresponding to the project for each project may be obtained in operation S100.

The patent classification may use international standard patent classifications such as International Patent Classification (IPC), or national standard patent classifications such as United States Patent Classification (USPC). The patent classification has a depth of the patent classification according to a patent classification system, and when using IPC, a subclass or main group level (depth) is preferably used. In addition, when using USPC, it is preferable that a class or a sub patent classification level of the class be used. The patent classification may use only a main classification, or may use a sub classification together with the main patent classification.

Industrial classification information may be standard industrial classification (SIC) or predetermined industrial classification.

Next, in operation S110, the method includes calculating an industrial distribution ratio based on the industrial classification. Specifically, the industrial classification is related to the patent classification in an industrial classification group such as SIC. The industrial distribution ratio may be calculated by dividing the number of industrial classifications by the total number of industrial classifications included in the industrial classification group. When the distribution ratio for each industry is high, the industry convergence potential is large, and when the related technologies are concentrated in a specific industry, the degree of technological convergence is high.

Next, in operation S120, the method includes selecting at least two of the industrial classifications in the order of larger number of patents related to the industrial classification. In this instance, it is preferable that three industrial classifications be selected.

Next, in operation S130, the method includes calculating the degree of technological convergence based on the number of patents related to the industrial classifications selected in operation S120. The degree of technological convergence may be calculated by dividing the number of patents related to the selected industrial classification by the total number of patents included in the patent group.

Next, in operation S140, the method includes calculating a relation score of heterogeneous industries based on the industrial distribution ratio and the degree of technological convergence. For example, the relation of the heterogeneous industries is proportional to the industrial distribution ratio, but inversely proportional to the degree of technological convergence, and therefore the industrial distribution ratio may be divided by the degree of technological convergence to be calculated.

Next, in operation S150, the method includes calculating a technological distribution ratio based on the number of patents related to the industrial classifications selected in operation S120. For example, the technological distribution ratio with respect to a first industrial classification may be calculated by dividing the number of patents related to a first corresponding industrial classification by the total number of patents included in the patent group.

Next, in operation S160, the method includes calculating a technological occupation ratio based on the number of patent classifications including the patent related to the industrial classifications selected in operation S120. For example, the technological occupation ratio may be calculated by dividing the number of patent classifications including the patent related to the industrial classification by the number of patent classifications which can be related to the industrial classification.

Next, in operation S165, the method includes normalizing the technological occupation ratio based on a correction coefficient of the technological occupation ratio.

The following Equation (7) is an example of a method for normalizing the technological occupation ratio.

$$NTSn = TSn * Kn \quad \text{Equation (7)}$$

(NTSn: normalized technological occupation ratio, TSn: technological occupation ratio, and Kn: correction coefficient)

(Correction coefficient $(Kn(n=2,3))=Kn-1*$(sum of the number of middle classification patents of analysis set of $Topn$/sum of the number of patents for each middle classification patent of $Top1$)*$TPn$ Correction coefficient of first corresponding industrial classification $K1=1$ Correction coefficient of second corresponding industrial classification $K2=K1*$(the number of patent classifications including patents related to second corresponding industrial classification/the number of patent classifications that can be related to first corresponding industrial classification)*$TP2$ Correction coefficient of third corresponding industrial classification $K3=K2*$(the number of patent classifications including patents related to third corresponding industrial classification/the number of patent classifications that can be related to second corresponding industrial classification)*$TP3$)

In this instance, it is preferable that the correction coefficient be differently applied for each rank of corresponding industrial classifications.

Next, in operation S170, the method includes calculating a relation score of homogeneous industries based on the technological distribution ratio and the technological occupation ratio.

For example, the relation score of homogeneous industries may be calculated by dividing an average of the normalized technological occupation ratios by a sum of distribution ratios for each industry.

Next, in operation S180, the method includes calculating an industry relation index using the relation score of heterogeneous industries and the relation score of homogeneous industries. For example, the industry relation index may be calculated in consideration of distribution of each of the relation score of heterogeneous industries and the relation score of homogeneous industries.

Figure 3:
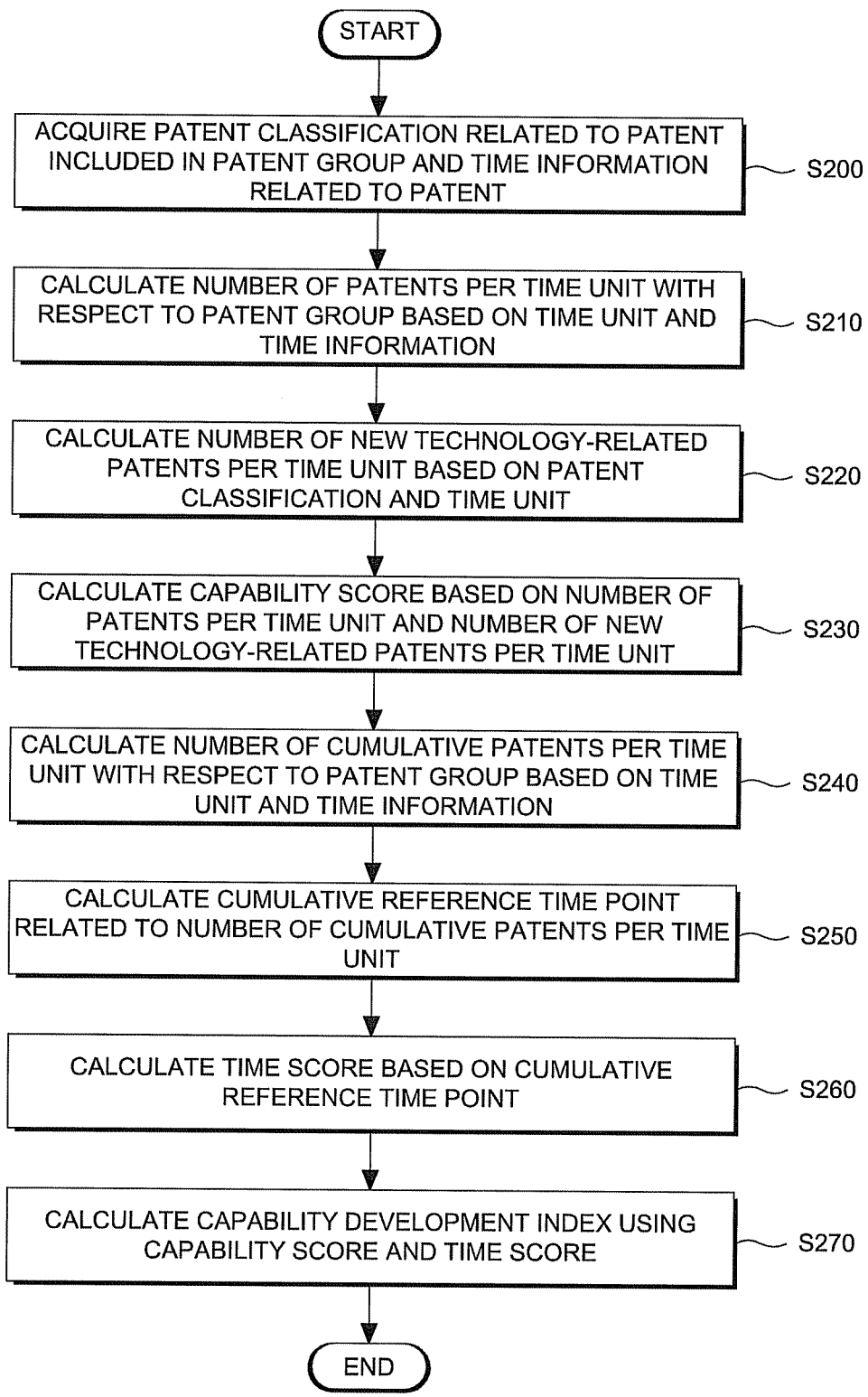
FIG. 3 is a flowchart showing a method for calculating a capability development index according to an embodiment of the present invention.

FIG. 3 is a flowchart showing a method for calculating a capability development index according to an embodiment of the present invention.

Referring to FIG. 3, in operation S200, the patent classification related to the patent included in the patent group and the time information related to the patent are acquired.

The patent group may be obtained by removing noise from results searched through a search engine based on search expressions including information about specific products, technologies, applicants, and the like. In addition, the patent group includes only published patents, only registered patents, or a mixture thereof. In the case of the mixture thereof, the same or different weights may be given to the published patents and the registered patents. In operation S200, the patent group may be obtained through search expressions, but the patent group may be obtained using patent data (patent number and the like) stored in a user computer. Meanwhile, when a user manages a project for calculating a plurality of convergence indexes, at least one patent group corresponding to the project for each project may be obtained in operation S100. Meanwhile, when a user manages a project for calculating a plurality of convergence indexes, at least one patent group corresponding to the project for each project may be obtained in operation S100.

The time information may be a reference date for calculating a convergence index, and include any one of the earliest date, a filing date, a publication date, and a registration date. The time information preferably uses the earliest date or the filing date as the reference date, and for the sake of accuracy, more preferably uses the date considered earliest in the priority claim as the reference date.

The patent classification may use international standard patent classifications such as IPC, or national standard patent classifications such as USPC. The patent classification has a depth of the patent classification according to a patent classification system, and when using IPC, a subclass or main group level (depth) is preferably used. In addition, when using USPC, it is preferable that a class or a sub patent classification level of the class be used. The patent classification may use only a main classification, or may use a sub classification together with the main patent classification.

Next, in operation S210, the number of patents per unit time is calculated based on unit time and the time information with respect to the patent group. Specifically, the number of patents per unit time is calculated based on unit time (for example, year) with respect to the patent group including at least two patents.

Next, in operation S220, the number of new technology-related patents per unit time is calculated based on the patent classification and unit time. Specifically, in order to calculate the number of new technology-related patents per unit time, when there is no patent based on a predetermined patent classification depth and then a patent appears at a specific time point T, this can be seen as appearance of new technology. For example, when an initial patent appears in a corresponding unit using a USPC class unit or an IPC subclass unit, it can be seen as appearance of new technology at this time.

Next, in operation S230, a capability score is calculated based on the number of patents per unit time and the number of new technology-related patents per unit time. Specifically, a new technology score is first calculated based on the number of patents per unit time and the number of new technology-related patents per unit time.

The following Equation (1) is an example of a method for calculating a new technology score (DFDi) per year.

$$DFDi=NPi*Wp+NTi*Wt \quad \text{Equation (1)}$$

(DFDi: new technology score in year i, NPi: the number of patents per year, Wp: patent weights, NTi: the number of new technology-related patents, and Wt: technological (classification) weights)

Meanwhile, the new technology score may be calculated using a depreciation coefficient in consideration of technological obsolescence. The depreciation coefficient is obtained by reflecting a reduction in the value of technology over time in consideration of a life cycle of technology. Specifically, the new technology score may be calculated by multiplying the right hand side of Equation (1) by a depreciation coefficient of the corresponding year (depreciation coefficient $\alpha \leq 1$).

Next, a technological cumulative score per year is calculated based on the calculated new technology score per year.

The following Equation (2) is an example of a method for calculating a technological cumulative score (CDFDi) per year.

$$CDFDi=DFD0+DFD1+DFD2+\ldots+DFDi-1+DFDi \quad \text{Equation (2)}$$

(CDFDi: technological cumulative score per year, and DFDi: new technology score in year i)

Next, a capability score (FS) is calculated based on the technological cumulative score (CDFDi) per year.

The following Equation (3) is an example of a method for calculating the capability score (FS).

$$FS=(CDFDn-CDFDt-1)/(CDFDn) \quad \text{Equation (3)}$$

(FS: capability score, CDFDn: technological cumulative score in entire year n, and CDFDn-CDFDt-1: technological cumulative score after time point t)

Figure 5:
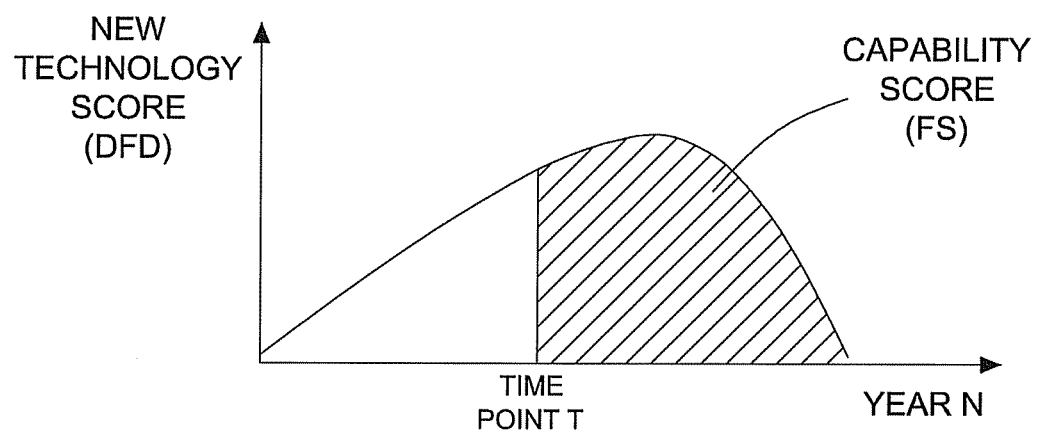
FIG. 5 is a graph showing an example of a process for calculating a capability score according to an embodiment of the present invention.

That is, the capability score (FS) may be defined as the ratio of the technological cumulative score (CDFDn-CDFDt-1) after the time point t to the technological cumulative score (CDFDn) in the entire year n as shown in FIG. 5.

Next, in operation S240, the cumulative number of patents per unit time is calculated based on unit time and the time information with respect to the patent group.

Next, in operation S250, a cumulative reference time point related to the cumulative number of patents per unit time is calculated.

Next, in operation S260, a time score is calculated based on the cumulative reference time point.

The following Equation (4) is an example of a method for calculating a time score (TS).

$$TS=(n-k)/(n) \quad \text{Equation (4)}$$

(TS: time score, n: entire period of time, and k: period of time until time point k)

Figure 6:
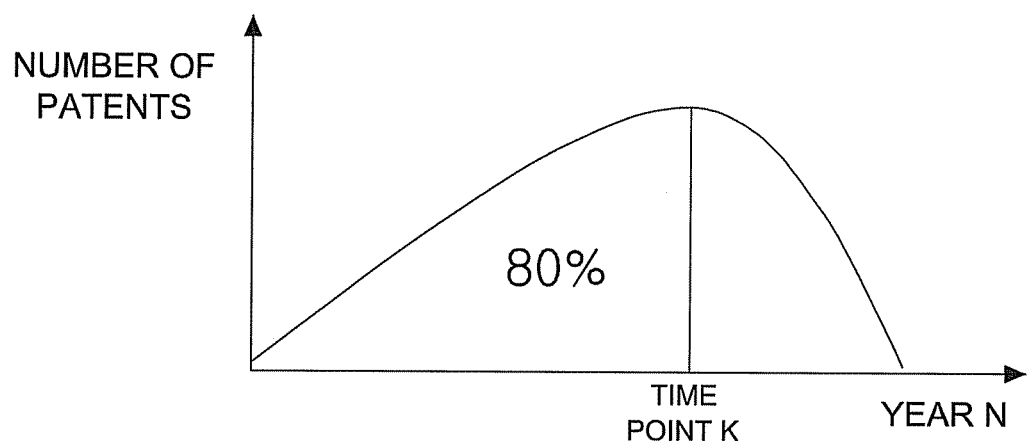
FIG. 6 is a graph showing an example of a process for calculating a time score according to an embodiment of the present invention.

For example, the time point k may be set as a time point in which the cumulative number of patents is 80% of the total as shown in FIG. 6.

For the capability development of a convergence product, both a product launch time point and development types of the patents should be considered. Main patents with respect to the convergence product are generally registered before a corresponding product is launched, and when the product is launched, the number of registered patents is likely to be significantly reduced. Thus, an increase in the number of registered patents may denote an increase in the development potential of the corresponding capability and a reduction in the number of registered patents may denote a decline of the development potential. When the highest point (peak) of the number of patent applications associated with the convergence product occupies a specific position (for example, a position corresponding to 80%) of the total cumulative number of patents, the time score may be calculated as shown in Equation (4).

Next, in operation S270, a capability development index is calculated using the capability score and the time score.

The following Equation (5) is an example of a method for calculating a capability development index (CI1).

$$CI1=FS*AFS+TS*ATS \quad \text{Equation (5)}$$

(CI1: capability development index, FS: capability score, AFS: distribution of capability score, TS: time score, and ATS: distribution of time score)

Referring again to FIG. 2, a capability convergence index is calculated based on the patent classification acquired in operation S200. Specifically, the capability convergence index may be calculated using the capability convergence score and the service score which are calculated based on the patent classification.

Figure 4:
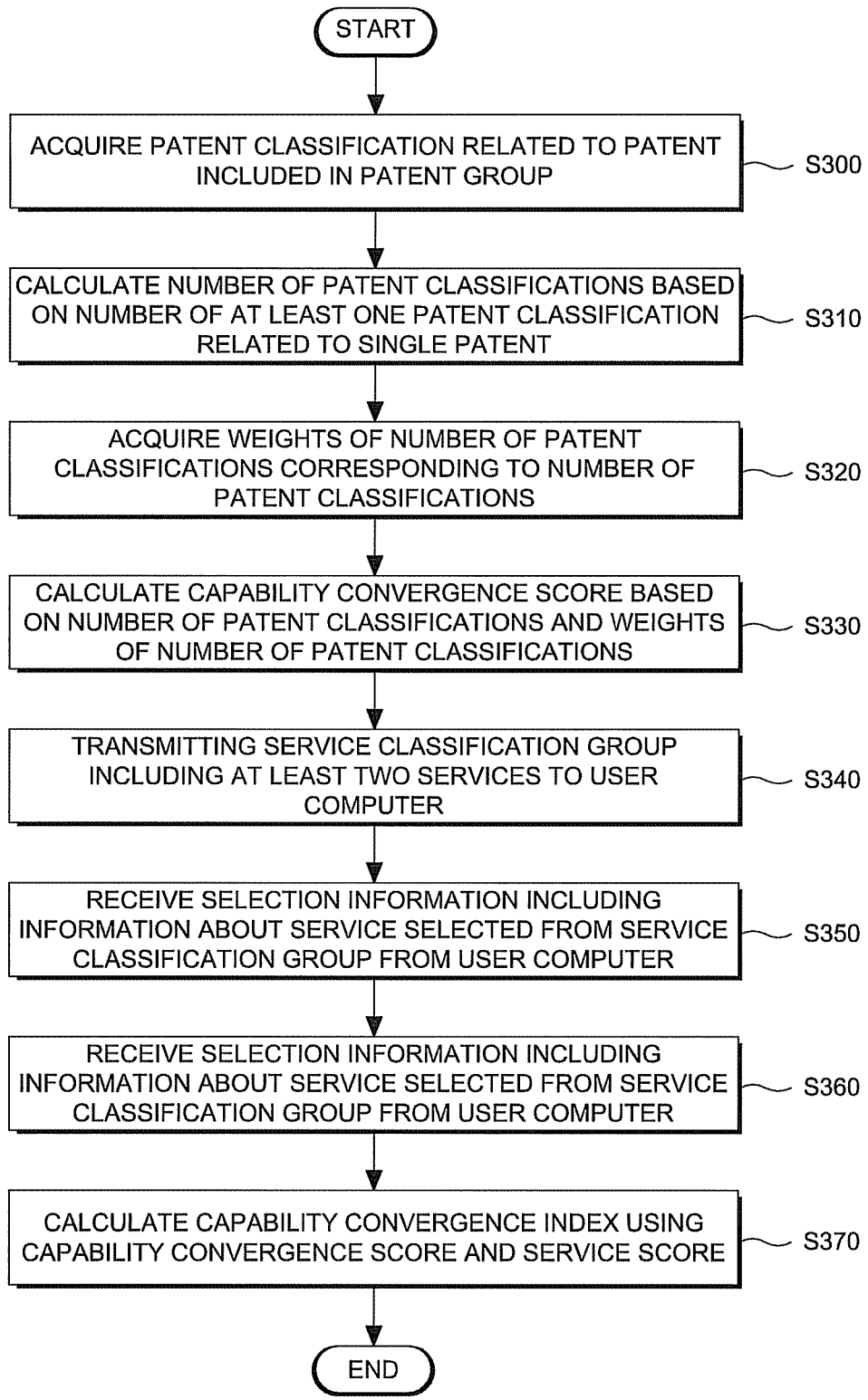
FIG. 4 is a flowchart showing a method for calculating a capability convergence index according to an embodiment of the present invention.

FIG. 4 is a flowchart showing a method for calculating a capability convergence index according to an embodiment of the present invention.

Referring to FIG. 4, first, in operation S300, the patent classification related to the patent included in the patent group is acquired.

The patent group may be obtained by removing noise from results searched through a search engine based on search expressions including information about specific products, technologies, applicants, and the like. In addition, the patent group includes only published patents, only registered patents, or a mixture thereof. In the case of the mixture thereof, the same or different weights may be given to the published patents and the registered patents. In operation S300, the patent group may be obtained through search expressions, or the patent group may be obtained using patent data (patent number and the like) stored in a user computer. Meanwhile, when a user manages a project for calculating a plurality of convergence indexes, at least one patent group corresponding to the project for each project may be obtained in operation S100.

The patent classification may use international standard patent classifications such as IPC, or national standard patent classifications such as USPC. The patent classification has a depth of the patent classification according to a patent classification system, and when using IPC, a subclass or main group level (depth) is preferably used. In addition, when using USPC, it is preferable that a class or a sub patent classification level of the class be used. The patent classification may use only a main classification, or may use a sub classification together with the main patent classification.

Next, in operation S310, the number of patent classifications is calculated based on the number of at least one of the patent classification related to the single patent.

Next, in operation S320, weights of the number of patent classifications corresponding to the number of patent classifications are acquired.

Next, in operation S330, a capability convergence score is calculated based on the number of patent classifications and the weights of the number of patent classifications.

The following Equation (6) is an example of a method for calculating a capability convergence score (FC).

$$FC = ACS * (WS/\Sigma(NCi)) * 1 - \exp(-\Sigma(NCi)/100)$$

(FC: capability convergence score, ACS: distribution of capability convergence score, $\Sigma(NCi)$: sum of the number of patents according to the number of patent classifications, $WS=\Sigma(NCi*Wi)$: weighted sum of the number of patents according to the number of patent classifications and the weights, NCi: the number of patents when the number of USPCs including patents is i or more, and Wi: weights when the number of USPCs including patents is i)

Next, in operation S340, a service classification group including at least two services is transmitted to the user computer.

Next, in operation S350, selection information including information about the service selected from the service classification group is received from the user computer.

Next, in operation S360, a service score is calculated based on the selection information.

Specifically, the number of services selected based on the selection information may be used as corresponding service information, and the service score may be created based on the corresponding service information. In this instance, the service score may be created using service weight information.

Next, in operation S370, a capability convergence index is calculated using the capability convergence score and the service score. For example, the capability convergence index may be calculated in consideration of distribution of each of the capability convergence score and the service score.

INDUSTRIAL APPLICABILITY

The present invention may be applied to measurement of the degree of convergence, estimation of convergence properties, calculation of a convergence index, and services using these with respect to products or technologies or the related patent group.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for processing patent information by a convergence index service system for calculating the convergence index, the method comprising:
   (a) acquiring a patent classification related to a patent included in a patent group and an industrial classification corresponding to the patent classification;
   (b) calculating an industrial distribution ratio based on the industrial classification;
   (c) selecting at least two of the industrial classification according to number of patents related to the industrial classification;
   (d) calculating a degree of technological convergence based on the number of patents related to the industrial classification selected in the step (c);
   (e) calculating a relation score of heterogeneous industries based on the industrial distribution ratio and the degree of technological convergence;
   (f) calculating a technological distribution ratio based on the number of patents related to the industrial classification selected in the step (c);
   (g) calculating a technological occupation ratio based on number of patent classification including the patent related to the industrial classification selected in the step (c);
   (h) calculating a relation score of homogeneous industries based on the technological distribution ratio and the technological occupation ratio; and
   (i) calculating an industry relation index using the relation score of heterogeneous industries and the relation score of homogeneous industries.

2. The method of claim 1, wherein the step (g) includes normalizing the technological occupation ratio based on a correction coefficient of the technological occupation ratio.

3. The method of claim 2, wherein the correction coefficient is applied according to a rank of the industrial classification.

4. The method of claim 1, wherein the patent classification is determined according to a predetermined depth in a patent classification system including the patent classification.

5. The method of claim 4, wherein the patent classification includes International Patent Classification (IPC), and the predetermined depth is any one of subclass, main group and n dot subgroup (where n is a natural number).

6. The method of claim 4, wherein the patent classification includes United States Patent Classification (USPC), and the predetermined depth is any one of class, no dot subclass and n dot subclass (where n is a natural number).

7. The method of claim 4, wherein the patent classification includes a main patent classification.

8. A method for processing patent information by a convergence index service system for calculating the convergence index, the method comprising:
- (a) acquiring a patent classification related to a patent included in a patent group and time information related to the patent;
- (b) calculating number of patents per unit time based on unit time and the time information for the patent group;
- (c) calculating number of new technology-related patents per unit time based on the patent classification and unit time;
- (d) calculating a capability score based on the number of patents per unit time and the number of new technology-related patents per unit time;
- (e) calculating cumulative number of patents per unit time based on unit time and the time information for the patent group;
- (f) calculating a cumulative reference time point related to the cumulative number of patents per unit time;
- (g) calculating a time score based on the cumulative reference time point; and
- (h) calculating a capability development index using the capability score and the time score.

9. The method of claim 8, wherein the step (d) includes calculating the capability score based on a depreciation coefficient indicating technological obsolescence.

10. The method of claim 8, wherein the unit time includes one year.

11. The method of claim 8, wherein the time information includes at least one of a filing date, a publication date and a registration date.

12. The method of claim 8, wherein the patent includes at least one of a published patent and a registered patent.

13. The method of claim 8, wherein the patent classification is determined according to a predetermined depth in a patent classification system including the patent classification.

14. The method of claim 8, wherein the patent classification includes a sub patent classification and a main patent classification.

15. A method for processing patent information by a convergence index service system for calculating the convergence index, the method comprising:
- (a) acquiring a patent classification related to a patent included in a patent group;
- (b) calculating number of patent classification related to a single patent;
- (c) acquiring weights of the number of patent classification corresponding to the number of patent classification;
- (d) calculating a capability convergence score based on the number of patent classification and the weights of the number of patent classification;
- (e) transmitting a service classification group including at least two services to the user computer;
- (f) receiving selection information including information on the service selected from the service classification group from the user computer;
- (g) calculating a service score based on the selection information; and
- (h) calculating a capability convergence index using the capability convergence score and the service score.

16. The method of claim 15, wherein the step (g) includes calculating the service score based on service weights.

17. The method of claim 15, wherein the patent classification is determined according to a predetermined depth in a patent classification system including the patent classification.

18. The method of claim 15, wherein the patent classification includes a main patent classification.

* * * * *